(12) United States Patent
Brunner et al.

(10) Patent No.: US 8,452,090 B1
(45) Date of Patent: May 28, 2013

(54) BAYER RECONSTRUCTION OF IMAGES USING A GPU

(75) Inventors: Ralph Brunner, Cupertino, CA (US);
Mark Zimmer, Aptos, CA (US); Kok Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2778 days.

(21) Appl. No.: 11/113,656

(22) Filed: Apr. 25, 2005

(51) Int. Cl.
*G06K 9/00* (2006.01)

(52) U.S. Cl.
USPC .......................................................... 382/167

(58) Field of Classification Search
USPC .......................................................... 382/167
See application file for complete search history.

(56) References Cited

U.S. PATENT DOCUMENTS

| | | | |
|---|---|---|---|
| 3,971,065 A | 7/1976 | Bayer | 358/41 |
| 5,490,246 A | 2/1996 | Brotsky et al. | 395/161 |
| 6,006,231 A | 12/1999 | Popa | 707/101 |
| 6,272,558 B1 | 8/2001 | Hui et al. | 709/328 |
| 6,717,599 B1 | 4/2004 | Olano | 345/853 |
| 2001/0045988 A1 * | 11/2001 | Yamauchi et al. | 348/273 |
| 2002/0118217 A1 | 8/2002 | Fujiki | |
| 2003/0174136 A1 | 9/2003 | Emberling et al. | |

FOREIGN PATENT DOCUMENTS

| | | |
|---|---|---|
| EP | 548 586 A | 6/1993 |
| EP | 0 694 879 | 1/1996 |
| EP | 1 383 080 | 1/2004 |
| WO | WO 98/45815 | 10/1998 |
| WO | WO 01/20547 A1 * | 3/2001 |
| WO | WO 02/09039 A | 1/2002 |

OTHER PUBLICATIONS

Sakamoto, T., Nakanishi, C., Hase, T., "Software pixel interpolation for digital still cameras suitable for a 32-bit MCU", Consumer Electronics, IEEE Transactions on, Nov. 1998, vol. 44, Issue: 4, pp. 1342-1352, ISSN: 0098-3063.*
"*Demosaicing Algorithms for Digital Cameras*", ImagEval, ISET Manual, Apr. 19, 2005
H. Malvar, L. He, and R. Cutler, "*High-Quality Linear Interpolation for Demosaicing of Bayer-Patterned Color Images*", Microsoft Research, May 17-21, 2004.
International Search report dated Jul. 27, 2005 (PCT/US 05/008804).
International Search report dated Aug. 8, 2005 (PCT/US 05/008805).
Haeberli, P. et al., "The Accumulation Buffer: Hardware Support for High-Quality Rendering," Computer Graphics, New York, NY, vol. 24, No. 4, Aug. 1, 1990, pp. 309-318.
C. Harris; "Using Programmable Graphics Hardware to Implement the Fuzzy C-Means Algorithm," School of Computer Science & Software Engineering, The University of Western Australia; Nov. 19, 2004.
Oppenheim et al.; "Digital Signal Processing," Copyright 1975.

* cited by examiner

*Primary Examiner* — John Strege
(74) *Attorney, Agent, or Firm* — Wong, Cabello, Lutsch, Rutherford & Brucculeri, LLP

(57) ABSTRACT

A system and method for performing Bayer reconstruction of images using a programmable graphics processing unit (GPU) are described herein. A Bayer filtered image in RAW format is uploaded to the GPU, unpacked, and reconstructed. Optionally, the reconstructed image may be transformed into any desired color space and/or displayed by a video card in which the GPU resides. The reconstruction is performed independently on each of the red, blue, and green image fields. The red and blue image fields are reconstructed using first and second interpolation passes in first and second orthogonal directions. Each reconstruction pass preferably employs a two-lobed Lanczos filter. The green image field is interpolated using a single interpolation pass in a direction diagonal to the first and second orthogonal directions, and preferably employs a box filter.

15 Claims, 4 Drawing Sheets

|   |   |   |   |   |   |   |   |   |
|---|---|---|---|---|---|---|---|---|
| G | R | G | R | G | R | ... | G | R |
| B | G | B | G | B | G | ... | B | G |
| G | R | G | R | G | R | ... | G | R |
| B | G | B | G | B | G | ... | B | G |
| ... | | | | | | | | |
| ... | | | | | | | | |
| G | R | G | R | G | R | ... | G | R |
| B | G | B | G | B | G | ... | B | G |

Fig. 1 (Prior Art)

| R,G,B,α (G,R,G,R) | R,G,B,α (G,R,G,R) | ... | R,G,B,α (G,R,G,R) |
|---|---|---|---|
| R,G,B,α (B,G,B,G) | R,G,B,α (B,G,B,G) | ... | R,G,B,α (B,G,B,G) |
| ... | | | |
| R,G,B,α (B,G,B,G) | R,G,B,α (B,G,B,G) | ... | R,G,B,α (B,G,B,G) |

| | a | b | c | d | e | f | g |
|---|---|---|---|---|---|---|---|
| 1 | | | | | | | |
| 2 | G | G | G | | G | G | G |
| 3 | | G | | G | | | |
| 4 | G | | G | | G | G | G |
| 5 | | G | | G | | | |
| 6 | G | | G | G | G | G | G |
| 7 | | G | | G | | | |

Fig. 3B

| | a | b | c | d | e | f | g |
|---|---|---|---|---|---|---|---|
| 1 | G' | G | G' | G | G' | G | G' |
| 2 | G' | G' | G' | G' | G' | G' | G' |
| 3 | G | G | G | G' | G' | G' | G' |
| 4 | G' | G' | G' | G | G | G | G |
| 5 | G | G' | G' | G' | G' | G' | G |
| 6 | G' | G | G | G | G | G | G' |
| 7 | | | | | | | |

Fig. 4A

| | a | b | c | d | e | f | g |
|---|---|---|---|---|---|---|---|
| 1 | R | | R | | R | | R |
| 2 | | | | | | | |
| 3 | R | | R | | R | | R |
| 4 | | | | | | | |
| 5 | R | | R | | R | | R |

Fig. 4B

| | a | b | c | d | e | f | g |
|---|---|---|---|---|---|---|---|
| 1 | R | R' | R | R' | R | R' | R |
| 2 | | | | | | | |
| 3 | R | R' | R | R' | R | R' | R |
| 4 | | | | | | | |
| 5 | R | R' | R | R' | R | R' | R |
| 6 | | | | | | | |
| 7 | R | R' | R | R' | R | R' | R |

Fig. 4C

| | a | b | c | d | e | f | g |
|---|---|---|---|---|---|---|---|
| 1 | R | R' | R | R' | R | R' | R |
| 2 | R'' | R'' | R'' | R'' | R'' | R'' | R'' |
| 3 | R | R'' | R | R'' | R | R'' | R |
| 4 | R'' | R'' | R'' | R'' | R'' | R'' | R'' |
| 5 | R | R' | R | R' | R | R' | R |
| 6 | R'' | R'' | R'' | R'' | R'' | R'' | R'' |
| 7 | R | R' | R | R' | R | R' | R |

|   | a | b | c | d | e | f | g |
|---|---|---|---|---|---|---|---|
| 1 | B | B' | B | B' | B | B' | B |
| 2 | B" | B" | B" | B" | B" | B" | B" |
| 3 | B" | B" | B" | B" | B" | B" | B |
| 4 | B | B" | B" | B" | B" | B" | B" |
| 5 | B" | B" | B" | B" | B" | B" | B" |
| 6 | B" | B" | B" | B" | B" | B" | B" |
| 7 | B | B' | B | B' | B | B' | B |

BAYER RECONSTRUCTION OF IMAGES USING A GPU

CROSS REFERENCE TO RELATED APPLICATIONS

The subject matter of the present invention is generally related to the following jointly owned and co-pending patent applications, each of which is hereby incorporated by reference in its entirety:

"System for Reducing the Number of Programs Necessary to Render an Image," by John Harper, Ser. No. 10/826,773, filed Apr. 16, 2004;

"System for Optimizing Graphics Operations," by John Harper, Ralph Brunner, Peter Graffagnino, and Mark Zimmer, Ser. No. 10/825,694, filed Apr. 16, 2004; and "High Level Program Interface for Graphics Operations," by John Harper, Ralph Brunner, Peter Graffagnino, and Mark Zimmer, Ser. No. 10/826,762, filed Apr. 16, 2004.

BACKGROUND

The present disclosure relates to the field of computer graphics processing. Particularly disclosed herein are techniques for increasing the computational efficiency of Bayer reconstruction, or more generally de-mosaicing, of an image.

As is generally known to those skilled in the art, the image sensors employed in most color digital cameras and/or video cameras are not truly color sensors. The CCD and CMOS image sensors used only detect brightness, i.e., the amount of light that strikes a particular pixel. For many years, it has been common practice to employ various filter arrangements in connection with the sensor such that each pixel receives light of a particular color. One such arrangement is known as a Bayer filter or color filter array (CFA), and is described generally in U.S. Pat. No. 3,971,065 to Eastman Kodak naming as inventor Bryce Bayer, which is hereby incorporated by reference in its entirety.

A schematic diagram of an image 100 produced with a Bayer filter is illustrated in FIG. 1. The image comprises a plurality of pixels 101. Each pixel is disposed behind a filter responsive to one of three or more components of colored light, e.g., red, green, and blue. Because human vision is more responsive to the green wavelengths of light, it is desirable to have a higher number of green samples, as compared to the red and blue wavelengths where human vision is less sensitive. Thus, a first row 102 of the sensor has alternating green and red filtered pixels, denoted "G" and "R". Similarly, a second row 103 of the sensor has alternating blue and green filtered pixels, denoted "B" and "G". The rows continue in this alternating pattern to form the entire image. As taught by Bayer, this arrangement is beneficial in that: (1) it provides the most samples (half of the array) to the more important green wavelengths and (2) it provides sampling of each color that is of roughly corresponding spatial distribution.

However, there are some problems associated with this arrangement. Because the samples of each color are not coincident, the perceived quality of the image is somewhat degraded. Additionally, the true resolution of the image is somewhat less than the actual number of pixels employed. For many applications, it is desired to reconstruct the image so as to provide a red, green, and blue color sample at each pixel location. This process is known as Bayer reconstruction.

Bayer reconstruction generally involves computing the two missing color elements of each sample by estimating from adjacent pixels, for example, as a weighted average. For instance, the green value of pixel 104, which is sampled as a red pixel, can be determined as a function of the three adjoining green pixels. Similarly, the blue value of pixel 104 can be determined as a function of the two adjacent blue pixels. Additionally, it is not necessary to reference only pixels of the same color, as some algorithms reference adjoining pixels of all colors. A variety of these techniques are known in the art and are thus not reproduced in detail here.

One common problem with all of these techniques is computational intensity. Because two missing color values must be computed for each pixel, and these missing values are computed as a function of several surrounding pixels, the number of computations required increases dramatically with image size. Typical CPU based Bayer reconstruction algorithms used in professional photo editing applications may require as much as 30 seconds to process a high resolution image. Therefore what is needed in the art is a technique to increase the computational efficiency of Bayer reconstruction.

SUMMARY

A system and method for performing Bayer reconstruction of images using a programmable graphics processing unit (GPU) are described herein. A Bayer filtered image in RAW format is uploaded to the GPU, unpacked, and reconstructed. Optionally, the reconstructed image may be transformed into any desired color space and/or displayed by a video card in which the GPU resides. The reconstruction is performed independently on each of the red, blue, and green image fields. The red and blue image fields are reconstructed using first and second interpolation passes in first and second orthogonal directions. Each reconstruction pass preferably employs a two-lobed Lanczos filter. The green image field is interpolated using a single interpolation pass in a direction diagonal to the first and second orthogonal directions, and preferably employs a box filter.

BRIEF DESCRIPTION OF THE DRAWINGS

FIG. 1 depicts the prior art color sampling arrangement of a Bayer filtered image sensor.

FIG. 2 depicts a color image in RAW format as uploaded to a GPU in RGBα format in accordance with the teachings of the present disclosure.

FIGS. 3A-3B depict reconstruction of missing green samples in accordance with the teachings of the present disclosure.

FIGS. 4A-4C depict reconstruction of missing red samples in accordance with the teachings of the present disclosure.

DETAILED DESCRIPTION

Figures 5, 6:
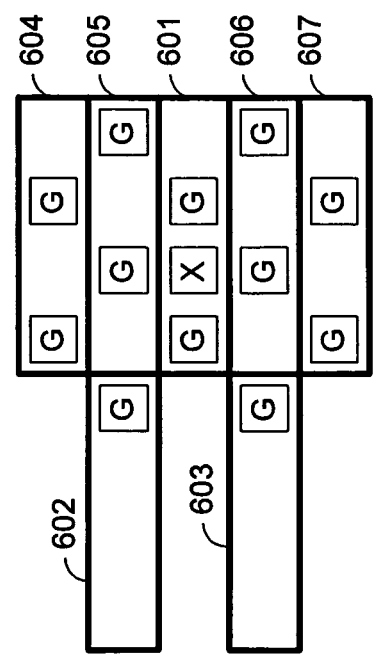
FIG. 5 depicts a blue image plane reconstructed in accordance with the teachings of the present disclosure.
FIG. 6 depicts the selection of RGBα samples to provide necessary green values for reconstruction of the green image plane in accordance with the teachings of the present disclosure.

A system and method for performing Bayer reconstruction of images using a programmable graphics processing unit (GPU) are described herein. The following embodiments, described in terms of applications compatible with computer systems manufactured by Apple Computer, Inc. of Cupertino, Calif., are illustrative only and should not be considered limiting in any respect. The following descriptions are presented to enable any person skilled in the art to make and use the invention as claimed and are provided in the context of the particular examples discussed below, variations of which will be readily apparent to those of ordinary skill in the art. Accordingly, the claims appended hereto are not intended to be limited by the disclosed embodiments, but are to be accorded their widest scope consistent with the principles and features disclosed herein.

Computer systems employing modern programmable graphics processing units (GPUs) in addition to conventional CPU arrangements provide one solution to the aforementioned problems. In such systems, the GPU typically resides on a video card. Presently, there are many commercially available programmable GPUs. While both programmable and non-programmable GPUs offer enhanced speed for graphics calculations, programmable GPUs differ in that they offer a high measure of flexibility. In practical terms, programmability is an important advantage because it allows programs to use the graphics chip in ways similar to the system microprocessor. By using the GPU this way, the system can generate virtually limitless graphics effects without loading the system CPU.

GPU programs may be created in advance by a programmer or may be "just in time" created and compiled by a higher level application. Additionally, although execution speed is typically a high priority, the GPU programs may be stored in any form of solid state memory (such as system RAM or video RAM), optical memory (such as CD-ROM or DVD disks), or magnetic memory (such as hard disks, floppy disks, or magnetic tapes).

GPU programs, called fragment programs, allow a programmer to use the GPU to directly compute an image. A fragment program is a collection of program statements designed to execute on a programmable GPU. The name "fragment" program derives from the fact that the unit of data being operated upon is generally a pixel, i.e., a fragment of an image. Typically, fragment programs specify how to compute a single output pixel based on one or more source pixels. Many instances of such fragments may be run in parallel on the GPU to generate the final output image. Because many pixels are processed in parallel, GPUs can provide dramatically improved image processing capability (e.g., speed) over methods that rely only on a computer system's CPU (which is also responsible for performing other system and application duties). This advantage provides for great speed enhancement of complex graphical manipulations, such as Bayer reconstruction.

In the object-oriented programming context of most modern units (GPUs), there are generally four types of objects available to a programmer: images, filters, contexts, vectors, and textures. An image is generally either the result of rendering (a pixel image) or a representation of the same. A filter is generally high-level functions that are used to affect images. A context is a space, such as a defined place in memory where the result of a filtering operation resides. A vector is a collection of floating point numbers, for example, the four dimensional vector used to describe the appearance of a pixel (red, blue, green and transparency levels). Each of these definitions is somewhat exemplary in nature, and the foregoing definitions should not be considered exclusive or otherwise overly restrictive. Techniques for interacting with these objects are disclosed in Assignee's co-pending patent applications referenced above.

As discussed above, an image sensor in a typical digital camera only measures a single color at each pixel location. This data is available from the camera in the form of a RAW format file. RAW files concerned with photography are formats that contain information that is closely tied with the state of camera's sensors, and different manufacturers have different formats for this. These formats are distinct from generic raw graphics formats in that the information is generally centered around a Bayer pattern of cells prior to any processing being applied to it instead of color channel values in some color space. As used herein, RAW format simply means any format in which the unprocessed sensor data is available to the GPU, and may encompass any variety of specific formats used by a given camera or other source.

To fully exploit the capabilities of a programmable GPU, this RAW data is uploaded directly to a video card (which incorporates a programmable GPU). In one embodiment, the data is presented to the card in RGBα format, such that a single pixel contains four horizontally adjacent sample points. Such a format is illustrated in FIG. 2. It should be noted that other formats, e.g., αRGB, αBGR and BGRα are also common, and the techniques disclosed herein apply equally to such formats, which are referred to herein as multi-value per pixel color formats. Packing the RAW data into one of these format results in memory and transfer time savings because the image transferred to memory need only be one-quarter of the actual image size. Additionally, this format achieves substantial parallelism during the reconstruction passes.

Alternatively, the data can be transferred to the GPU as grayscale (one component per pixel). By this approach, the memory bandwidth savings are also realized, and it is not necessary for the GPU to unpack the image, resulting in simpler GPU code. However, this approach does require more look-ups in the fragment programs that perform the reconstruction.

With reference to FIG. 2, image 200 comprises a plurality of pixels, e.g., 201. Each pixel is a vector of four values. In the ultimate output image, these four values will correspond to a red ("R"), green ("G"), and blue ("B") value for each pixel, as well as a transparency value ("α"). For purposes of the techniques described herein, the transparency value will be empty when the de-mosaicing is complete. However, prior to displaying the image, the video card (i.e., GPU) may adjust the transparency value of the pixels to accomplish a desired display effect. However, as originally transferred to the GPU, each pixel contains four adjacent samples from the RAW image. Thus, pixel 201 contains, in order, the sample values from pixel 101 (FIG. 1) of the raw image, pixel 104 (FIG. 1) of the "RAW" image, as well as the two intervening pixels. Similarly, pixel 202 (FIG. 2) of image 200 includes the first four samples (two blue and two green) of row 103 (FIG. 1). Image 200 is therefore one-fourth the width of the original image.

GPU fragment programs are then executed to unpack the data and perform the interpolations necessary to calculate the "missing" samples. In one embodiment, the sequence of reconstruction is as follows: green samples are reconstructed, which involves a single interpolation pass on the diagonal; red samples are reconstructed, which involves two interpolation passes, one horizontal and one vertical; and blue samples are reconstructed, which also involves two interpolation passes, one horizontal and one vertical. Each interpolation pass requires a fragment program, which can be evaluated for each pixel in the image. Programmable GPUs are typically capable of evaluating a fragment program on multiple pixels (e.g., 4, 8, or 16) in parallel, so the actual number of executions times the number of simultaneously evaluated pixels will equal the total number of pixels of the image.

The interpolation process may be better understood with reference to FIGS. 3A-3B, 4A-4C, and 5, which depict the computation process for the interpolation of green, red, and blue pixels, respectively. A starting point for interpolation of the green pixel data is illustrated in FIG. 3A, which depicts an arbitrary portion of the source image. As noted above, one-half of the pixels in a Bayer filtered source image are green pixels, and the pixels are arranged in a checkerboard pattern. To properly reconstruct the green image plane, it is necessary to use a box filter, which operates on the pixels along a line 45-degrees to the horizontal and vertical. This filter is implemented in a first fragment program.

In one embodiment, best understood with reference to FIG. 6, the box filter will compute the green value of an interpolated pixel X with reference to the 12 nearest surrounding green sample values. Because the source image uploaded to the GPU is in the RGBa format illustrated in FIG. 2, it is necessary to select seven source pixels vectors 601-607 to pick up each of the required source samples. The seven source image pixel vectors selected will always include: (1) the source image pixel vector in which the value being interpolated lies (e.g., 601), (2) the two source image pixel vectors immediately above (e.g., 604 and 605) and the two source image pixel vectors immediately below (e.g., 606 and 607) the source image pixel vector in which the value being interpolated lies, and (3) two additional source image pixel vectors, one located above (e.g., 602) and one located below (e.g., 603) the source image pixel vector in which the value being interpolated lies, both being either to the right or left depending on the position of the value being interpolated within its pixel vector. Alternatively, the green reconstruction could also refer to the red and blue information in the source image, for example, if reconstructing a green value for a red pixel, the red data may be used to detect an edge occurring at the location of the missing green pixel.

Whatever the particular nature of the green reconstruction algorithm, the output of this fragment program, which is the green image plane, is depicted in FIG. 3B, in which G represents the original green sample values and G' represents the interpolated sample values computed by the fragment program.

With reference to FIG. 4A, an arbitrary region within the source image is depicted schematically. Only the pixels for which red values were present in the original image are shown, although it is understood that the source image is actually in the format of FIG. 2. In a first horizontal pass, completed by multiple executions of a first fragment program on the source image, red sample values are computed for each sample based on horizontally adjacent red sample values. Thus, for example, the red value of pixel d1 is calculated from the red values of pixels a1, c1, e1, and g1. Similarly, for pixel d3, a red value is calculated from the red value of pixels a3, c3, e3, and g3.

The interpolation need not refer only to two adjacent pixels, but may include additional pixels further removed or may include only immediately adjacent pixels. Alternatively, the red value of pixel d1 may also be calculated with reference to adjoining pixels of other colors as well. For example, some algorithms use the reconstructed green information to improve the red and blue reconstruction by exploiting the luminance correlation between the three channels. Furthermore, for pixels located near the edge of an image, the computation may be altered in a variety of manners. For example, the edge values may be computed only as a function of pixels away from the edge, or some other constant value may be substituted into the calculation for the pixel values that lay outside the image domain. Additionally, the first, horizontal pass only needs to output a half-height image. Every other line does not contain data relevant for the process at this point, as can be seen with reference to FIG. 4B, so just writing out all even (or all odd) lines saves memory.

Once this first, horizontal pass is completed, the image of FIG. 4B results, in which R' denotes the red values completed during the first, horizontal interpolation pass. Now, a vertical interpolation pass is performed, by executing a second fragment program on the image of FIG. 4B. In this vertical pass, missing rows are computed from the rows above and below. For example, the red value of pixel d4 is computed as a function of pixels d1, d3, d5, and d6. The other pixels are computed similarly. This results in the image of FIG. 3C, in which R" denotes red values computed during the second, vertical interpolation pass. This image is the red image plane that will ultimately be combined to form the final image.

A substantially identical process is followed for the blue samples. This creates the image shown in FIG. 5, i.e., the blue image plane, in which B represents blue pixel values present in the original image, B' represents blue pixel values computed during a first, horizontal interpolation pass, and B" represents blue pixel values computed during a second, vertical interpolation pass.

In one embodiment, the red and blue interpolation steps in both the horizontal and vertical directions are performed using a two-lobed Lanczos filter. The Lanczos filter is a windowed sinc function (i.e., $\sin(x)/x$). Alternatively, any one of a variety of filters suitable for the purpose and known to those skilled in the art could be used without departing from the basic technique described herein. Construction of such filters is generally known to those skilled in the art, and implementation of such a filter on a programmable GPU would be within the abilities of one skilled in the art having benefit of this disclosure.

It should be noted that in one embodiment only three (or four) unique fragment programs are required for the interpolation steps. A first fragment program is necessary to perform the horizontal interpolation. Alternatively, two fragment programs may be provided, one to interpolate on the even columns, one to interpolate on the odd columns. A second fragment program is required to perform the vertical interpolation, however, this fragment is identical for both the red and blue color planes. Finally, a third fragment program is required to perform the green interpolation, which, as noted above is performed in a single pass on a 45-degree angle.

As a final step in the Bayer reconstruction algorithm, the three computed image planes are combined into a final RGB image by yet another GPU fragment program. As an optional step, a color transformation may be performed to map this image into any desired destination color space. Additional processing to include a transparency ("alpha") layer may also be performed if necessary or desired.

Using a GPU to perform Bayer reconstruction allows for significantly faster (approximately 5× faster with current hardware) processing compared to using the CPU alone. The advantages are further enhanced if the computed image is to be displayed after the Bayer reconstruction, in which case it would have to be transferred to the video card (where the GPU typically resides) anyway.

While the invention has been disclosed with respect to a limited number of embodiments, numerous modifications and variations will be appreciated by those skilled in the art. For example, the reconstruction for each color image field is independent of the other image fields and may be performed in any order or in parallel depending on hardware limitations. Furthermore, the techniques described herein are applicable to a wide variety of de-mosaic filters, and not just the widely used Bayer filter arrangement. It is intended that all such variations and modifications fall with in the scope of the following claims.

What is claimed is:

1. A method for performing de-mosaicing of an image using a programmable graphics processing unit, the method comprising:
uploading unprocessed image data to the graphics processing unit by packing the data into a multi-value per pixel color format;
unpacking the image data; and
estimating missing color information to form a reconstructed image.

2. The method of claim 1 further comprising color transforming the reconstructed image into a desired destination color space.

3. The method of claim 1 further comprising displaying the reconstructed image.

4. The method of claim 1 wherein estimating missing color information comprises:
reconstructing green values for each red pixel and each blue pixel wherein the green value for a particular pixel is computed as a function of one or more surrounding pixels;
reconstructing red values for each blue pixel and each green pixel wherein the red value for a particular pixel is computed as a function of one or more surrounding pixels; and
reconstructing blue values for each red pixel and each green pixel wherein the blue value for a particular pixel is computed as a function of one or more surrounding pixels.

5. The method of claim 4 wherein reconstruction of red values and reconstruction of blue values each comprise performing a first reconstruction pass in a first direction and a second reconstruction pass in a second direction orthogonal to the first.

6. The method of claim 5 wherein each of the first and second reconstruction passes employ a two-lobed Lanczos filter.

7. The method of claim 4 or 5 wherein reconstruction of green values comprises performing a single reconstruction pass in a diagonal direction.

8. The method of claim 7 wherein the single reconstruction pass employs a box filter.

9. A method for performing de-mosaicing of an image using a programmable graphics processing unit, the method comprising:
uploading unprocessed image data to the graphics processing unit in a grayscale image format; and
estimating missing color information to form a reconstructed image.

10. The method of claim 9 further comprising displaying the reconstructed image.

11. The method of claim 9 wherein estimating missing color information comprises:
reconstructing green values for each red pixel and each blue pixel wherein the green value for a particular pixel is computed as a function of one or more surrounding pixels;
reconstructing red values for each blue pixel and each green pixel wherein the red value for a particular pixel is computed as a function of one or more surrounding pixels; and
reconstructing blue values for each red pixel and each green pixel wherein the blue value for a particular pixel is computed as a function of one or more surrounding pixels.

12. The method of claim 11 wherein reconstruction of red values and reconstruction of blue values each comprise performing a first reconstruction pass in a first direction and a second reconstruction pass in a second direction orthogonal to the first.

13. The method of claim 11 or 12 wherein reconstruction of green values comprises performing a single reconstruction pass in a diagonal direction.

14. A computer readable medium, having embodied thereon machine executable instructions for performing a method according to any one of claim 1, 3, 9, or 10.

15. A computer system comprising a central processing unit and a programmable graphics processing unit, wherein the graphics processing unit is programmed to perform a method according to any of claim 1, 3, 9, or 10.

* * * * *